(12) United States Patent
Poster

(10) Patent No.: US 10,801,624 B2
(45) Date of Patent: Oct. 13, 2020

(54) PROTECTIVE LABYRINTH OVER MAST SEAL TO PROTECT FROM WATER INTRUSION

(71) Applicant: Bell Helicopter Textron Inc., Forth Worth, TX (US)

(72) Inventor: Scott David Poster, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 15/703,381

(22) Filed: Sep. 13, 2017

(65) Prior Publication Data

US 2018/0087670 A1 Mar. 29, 2018

Related U.S. Application Data

(60) Provisional application No. 62/399,097, filed on Sep. 23, 2016, provisional application No. 62/423,371, filed on Nov. 1, 2016.

(51) Int. Cl.

| *F16J 15/00* | (2006.01) |
|---|---|
| *F16J 15/453* | (2006.01) |
| *F16C 33/80* | (2006.01) |
| *F16J 15/3224* | (2016.01) |
| *B64C 27/12* | (2006.01) |

(Continued)

(52) U.S. Cl.
CPC ............ *F16J 15/453* (2013.01); *B64C 27/12* (2013.01); *F16C 33/80* (2013.01); *F16J 15/3224* (2013.01); *F16J 15/3232* (2013.01); *F16J 15/3248* (2013.01); *F16J 15/3284* (2013.01);

(Continued)

(58) Field of Classification Search
CPC .... F16J 15/453; F16J 15/3224; F16J 15/3232; F16J 15/3248; F16J 15/3284; F16J 15/54; B64C 27/12; F16C 13/00; B64D 35/00
See application file for complete search history.

(56) References Cited

U.S. PATENT DOCUMENTS

| 2,594,194 A * | 4/1952 | Metsger ................ F02N 15/021 |
|---|---|---|
| | | 277/589 |
| 3,363,911 A | 1/1968 | McKinven, Jr. |

(Continued)

FOREIGN PATENT DOCUMENTS

| EP | 3299284 A1 | 3/2018 |
|---|---|---|
| WO | 2015/186677 A1 | 12/2015 |

OTHER PUBLICATIONS

Bell Helicopter Textron Inc., "Bell 525 Relentless" Poster, Nov. 12, 2014.
Perry, Dominic , "Analysis: Bell 525 Relentless cutaway and Technical Description" Flight International, Nov. 14, 2014, London, https://www.flightglobal.com/news/articles/analysisbell525relentlesscutawayandtechnical405541/.

(Continued)

*Primary Examiner* — Gilbert Y Lee
(74) *Attorney, Agent, or Firm* — Edwin S. Flores; Daniel J. Chalker; Chalker Flores, LLP

(57) ABSTRACT

The present invention includes a helicopter rotor seal assembly comprising: a rotor mast having a longitudinal axis and an outer surface; a sleeve aligned longitudinally with the axis and surrounding a portion of the rotor mast, the sleeve having an outer surface, and an inner surface; an annular horizontal seal between the inner surface of the sleeve and the outer surface of the rotor mast; and an upper annular rotor mast seal affixed to the outer surface of the rotor mast and extending outwardly sufficient to cover the annular horizontal seal.

24 Claims, 3 Drawing Sheets

(51) Int. Cl.
  *F16J 15/3232* (2016.01)
  *F16J 15/3248* (2016.01)
  *F16J 15/3284* (2016.01)
  *F16J 15/54* (2006.01)
  *B64D 35/00* (2006.01)

(52) U.S. Cl.
  CPC .......... *B64D 35/00* (2013.01); *F16C 2326/43* (2013.01); *F16J 15/54* (2013.01)

(56) References Cited

U.S. PATENT DOCUMENTS

| | | | | |
|---|---|---|---|---|
| 4,609,072 A | * | 9/1986 | Attane | ............... F16H 57/04 184/6.11 |
| 5,641,269 A | | 6/1997 | Eller | |
| 2005/0001382 A1 | * | 1/2005 | Fitzsimons | ............. B64C 27/14 277/500 |
| 2011/0221140 A1 | | 9/2011 | Nakagawa | |
| 2013/0175764 A1 | | 7/2013 | Hamamoto | |

OTHER PUBLICATIONS

European Patent Office, Communication pursuant to Article 94(3) EPC for EP Appl. No. 17192696.7 dated Feb. 27, 2018, 9 pp.
European Patent Office, Communication pursuant to Article 94(3) EPC for EP Appl. No. 17192696.7 dated Sep. 20, 2018, 8 pp.
European Patent Office, European Search Report for EP Appl. No. 17192696.7 dated Feb. 5, 2018, 4 pp.
European Patent Office, Communication pursuant to Article 94(3) EPC for EP Appl. No. 17192696.7 dated Feb. 13, 2019, 6 pp.
European Patent Office, Communication pursuant to Article 94(3) EPC for EP Appl. No. 17192696.7 dated Jul. 8, 2019, 8 pp.

* cited by examiner

PROTECTIVE LABYRINTH OVER MAST SEAL TO PROTECT FROM WATER INTRUSION

CROSS-REFERENCE TO RELATED APPLICATIONS

This patent application claims priority to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

This application is not the subject of any federally sponsored research or development.

TECHNICAL FIELD OF THE INVENTION

The present invention relates in general to the field of water penetration, and more particularly, to a novel protective labyrinth over a mast seal to prevent water intrusion.

BACKGROUND OF THE INVENTION

Without limiting the scope of the invention, its background is described in connection with water intrusion.

U.S. Pat. No. 5,641,269, issued to Eller, and entitled "Helicopter rotor seal assembly", teaches a helicopter rotor seal for gas-driven helicopters wherein the rotor is rotatably driven by a compressed air jets at the tips of the rotors directed rearwardly with respect to rotor rotation. A non-rotatable mast extends vertically from the helicopter fuselage including a concentric bore for communication of compressed air therethrough. Positioned at the upper extremity of the mast, above the rotor blades, is a rotatable plenum for distributing compressed gas to the helicopter's respective rotor blades.

SUMMARY OF THE INVENTION

In one embodiment, the present invention includes a helicopter rotor seal assembly comprising: a rotor mast having a longitudinal axis and an outer surface; a sleeve aligned longitudinally with the axis and surrounding a portion of the rotor mast, the sleeve having an outer surface, and an inner surface; an annular horizontal seal between the inner surface of the sleeve and the outer surface of the rotor mast; and an upper annular rotor mast seal affixed to the outer surface of the rotor mast and extending outwardly sufficient to cover the annular horizontal seal. In one aspect, the annular horizontal seal comprises a base and one or more tines, each of the tines having a spring disposed between the tine and the base and provides substantially fluid-tight connection between the sleeve and the rotor mast. In another aspect, the upper annular rotor mast seal further comprises a vertical portion that covers the sleeve both horizontally and vertically. In another aspect, the upper annular rotor mast seal does not contact the sleeve. In another aspect, the upper annular rotor mast seal comprises a labyrinth seal. In another aspect, the upper annular rotor mast seal is a composite, a polymer, a rubber, a plastic, a fiberglass, a metal, an alloy, or combinations thereof. In another aspect, the annular horizontal seal is a composite, a polymer, a rubber, a plastic, a fiberglass, a metal, an alloy, or combinations thereof. In another aspect, the seal assembly further comprises an annular mast cover affixed to the outer surface of the rotor mast at the upper annular rotor mast seal, wherein the annular mast cover is a composite, a polymer, a rubber, a plastic, a fiberglass, a metal, an alloy, or combinations thereof. In another aspect, the polymer is at least one of a polyurethane, cellulose, fluoro-polymer, ethylene interpolymer ahoy elastomer, ethylene vinyl acetate, nylon, polyether imide, polyester, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyamides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetheramides and polysiloxanes, and blends of polyetherimides and poly(etherimide-siloxane) copolymers, or combinations thereof. In another aspect, the seal assembly further comprises a bearing below the annular horizontal seal between the inner surface of the sleeve and the outer surface of the rotor mast.

In another embodiment, the present invention also includes a method of preventing water penetration into a rotorcraft rotor mast comprising: affixing an annular mast cover on an outer surface of a rotatable rotor mast having a longitudinal axis; positioning a sleeve aligned with the longitudinal axis that surrounds a portion of the rotor mast, the sleeve having an outer surface and an inner surface; placing an annular horizontal seal between the inner surface of the sleeve and the annular mast seal, wherein the annular horizontal seal extends from the inner surface of the sleeve or extends from the annular mast seal to provide a first barrier that prevents water penetration; and affixing an upper annular rotor mast seal to the annular mast cover, wherein the upper annular rotor mast seal extends outwardly from the annular mast cover sufficient to cover the annular horizontal seal, wherein the upper annular rotor mast seal prevents or reduces water penetration at the rotor mast. In one aspect, the annular horizontal seal comprises a base and one or more tines, each of the tines having a spring disposed between the tine and the base and provides substantially fluid-tight connection between the sleeve and the rotor mast. In another aspect, the upper annular rotor mast seal further comprises a vertical portion that covers a top portion of the sleeve both horizontally and vertically. In another aspect, the upper annular rotor mast seal does not contact the sleeve. In another aspect, the upper annular rotor mast seal comprises a labyrinth seal. In another aspect, the upper annular rotor mast seal is a composite, a polymer, a rubber, a plastic, a fiberglass, a metal, an alloy, or combinations thereof. In another aspect, the annular horizontal seal is a composite, a polymer, a rubber, a plastic, a fiberglass, a metal, an alloy, or combinations thereof. In another aspect, the method further comprises affixing an annular mast cover to the outer surface of the rotor mast at the upper annular rotor mast seal, wherein the annular mast cover is a composite, a polymer, a rubber, a plastic, a fiberglass, a metal, an alloy, or combinations thereof. In another aspect, the polymer is at least one of a polyurethane, cellulose, fluoro-polymer, ethylene interpolymer ahoy elastomer, ethylene vinyl acetate, nylon, polyether imide, polyester, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyamides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetheramides and polysiloxanes, and blends of polyetherimides and poly(etherimide-siloxane) copolymers, or combinations thereof.

In another embodiment, the present invention includes a rotorcraft comprising: a fuselage, one or more engines, and a main rotor gearbox; and a rotor mast connected to the main rotor gearbox, the rotor mast having a longitudinal axis, an outer surface; a sleeve aligned with the longitudinal axis and surrounding a portion of the rotor mast, the sleeve having an outer surface and an inner surface; an annular horizontal seal between the inner surface of the sleeve and the outer surface of the rotor mast, wherein the annular horizontal seal extends from the inner surface of the sleeve or extends from the outer surface of the rotor mast; and an upper annular rotor mast seal affixed to the annular mast seal and extending outwardly from the outer surface of the rotatable rotor mast sufficient to cover the annular horizontal seal and the sleeve. In one aspect, annular horizontal seal comprises a base and one or more tines, each of the tines having a spring disposed between the tine and the base and provides substantially fluid-tight connection between the sleeve and the rotor mast. In another aspect, the upper annular rotor mast seal further comprises a vertical portion that covers the sleeve both horizontally and vertically. In another aspect, the upper annular rotor mast seal does not contact the sleeve. In another aspect, the upper annular rotor mast seal comprises a labyrinth seal. In another aspect, the upper annular rotor mast seal is a composite, a polymer, a rubber, a plastic, a fiberglass, a metal, an alloy, or combinations thereof. In another aspect, the annular horizontal seal is a composite, a polymer, a rubber, a plastic, a fiberglass, a metal, an alloy, or combinations thereof. In another aspect, the rotorcraft further comprises an annular mast cover affixed to the outer surface of the rotor mast at the upper annular rotor mast seal, wherein the annular mast cover is a composite, a polymer, a rubber, a plastic, a fiberglass, a metal, an alloy, or combinations thereof. In another aspect, at least one of the annular horizontal seal, or the upper annular rotor mast seal at least partially comprises a polymer selected from at least one of a polyurethane, cellulose, fluoro-polymer, ethylene interpolymer ahoy elastomer, ethylene vinyl acetate, nylon, polyether imide, polyester, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyamides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetheramides and polysiloxanes, and blends of polyetherimides and poly(etherimide-siloxane) copolymers, or combinations thereof.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
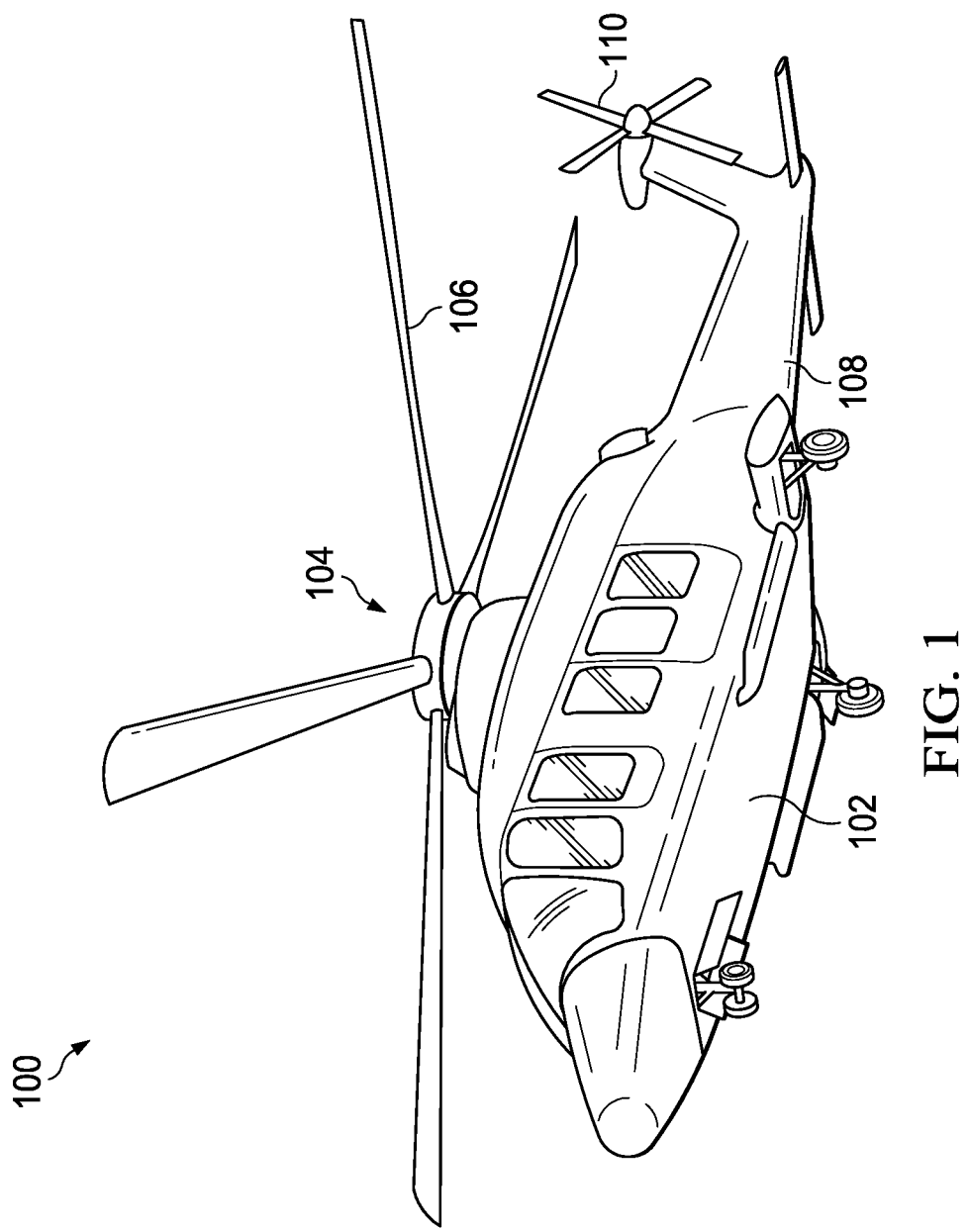
FIG. 1 shows a side view of a helicopter according to a preferred embodiment of the present application.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
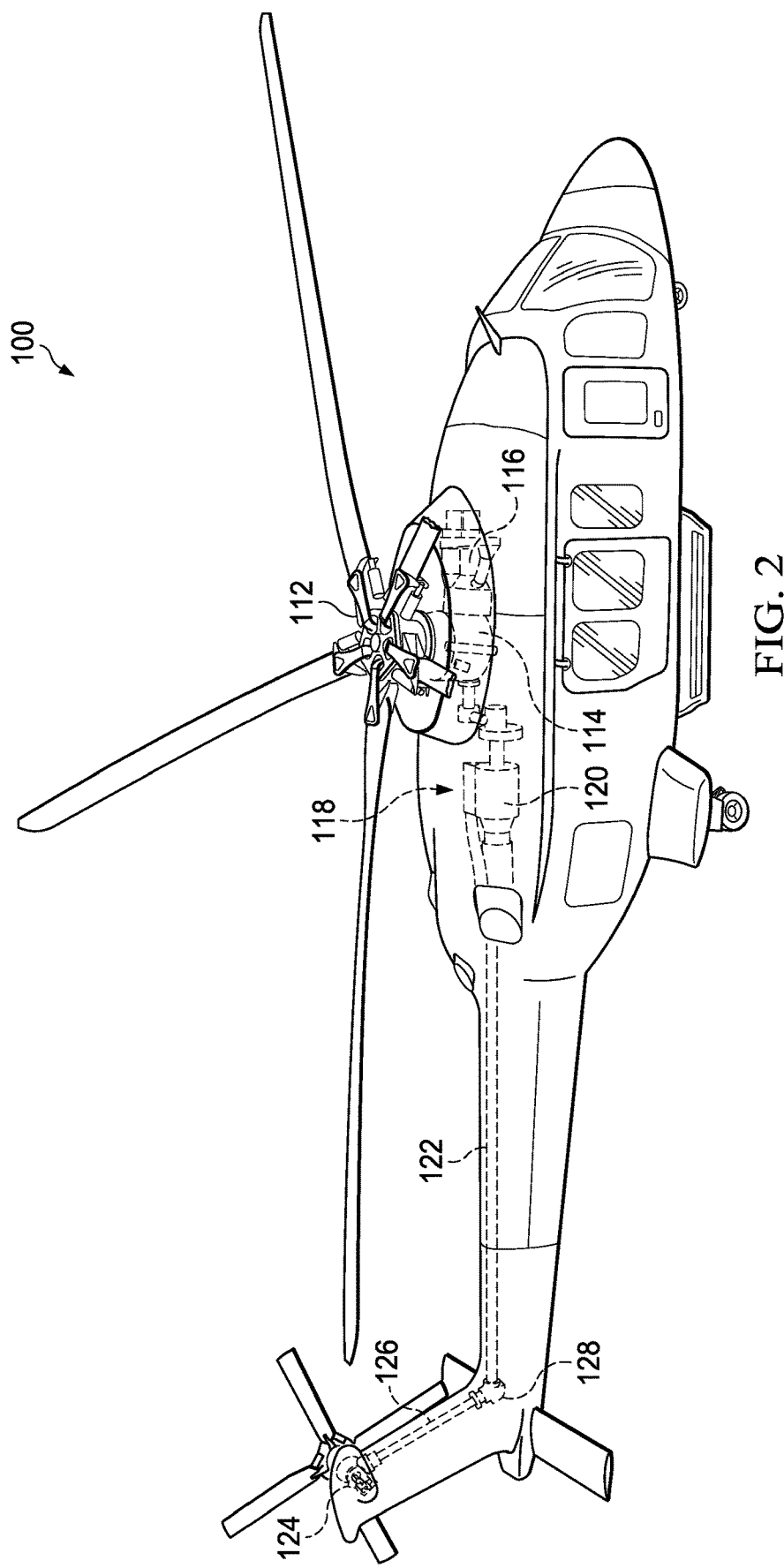
FIG. 2 shows a partial cross-section, perspective view of helicopter aircraft according to an alternative embodiment of the present application.

For example, FIG. 2 shows a partial cross-section isometric view of helicopter 100 that includes additional detail of the present invention. Helicopter 100 further includes a rotor mast 112, which is connected to the main transmission 114. The main transmission 114 is connected to one or more accessory gear boxes 116. The main transmission is connected to an engine 120, which is in an engine compartment 118. A tail rotor drive shaft 122 transmits mechanical rotation to the intermediate gear box 128, which is connected to the tail rotor gear box 124 via tail rotor drive shaft 126.

Figure 3:
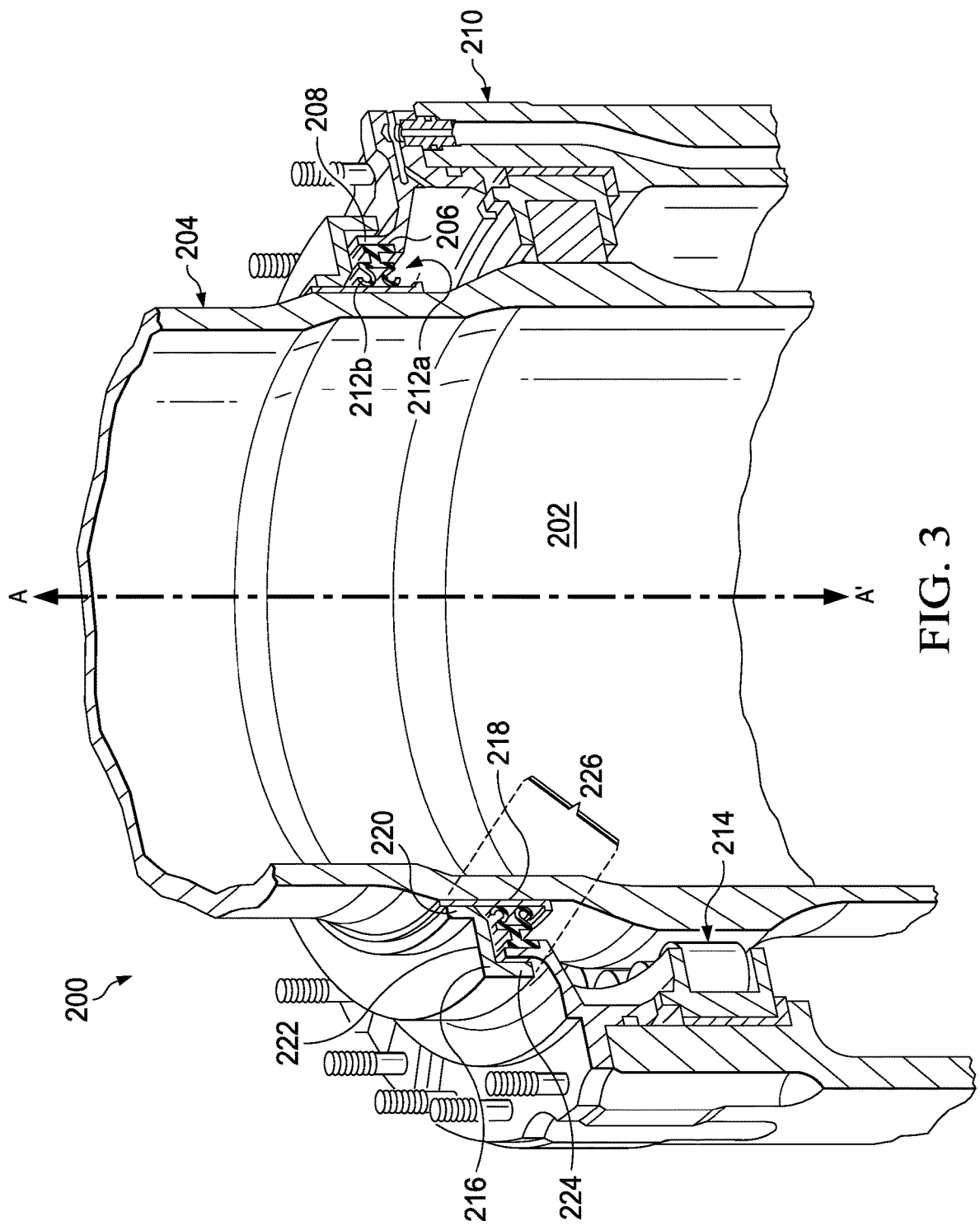
FIG. 3 is a cross-sectional side view of a rotor seal assembly of the present invention.

FIG. 3 is a cross-sectional side view of a rotor seal assembly 200 of the present invention. The rotor seal assembly 200 is depicted in relation to a top portion of the mast 202 having a longitudinal axis A-A', and an outer surface 204. An annular horizontal seal 206 is depicted attached to an inner surface 208 of sleeve 210 and projecting toward and in contact with the outer surface 204 of the mast 202. The annular horizontal seal 206 includes tines 212a, 212b contact mast sleeve 218, that provide flexibility to the annular horizontal seal 206 as the mast 202 rotates. Positioned below the annular horizontal seal 206 are depicted bearings 214 that surround and contact the outer surface 204 of the mast 202 to provide rotational alignment. The upper annular rotor mast seal 216 can be directly attached to the outer surface 204 of the mast 202, or in one configuration may also be attached to annular sleeve 218. The upper annular rotor mast seal 216 may include a mast attachment portion 220 (that can be fitted to the size of the mast 202), an outwardly extending portion 222, and may also optionally include a cover portion 224 that extends downward and that together form a labyrinthine path 226 that prevents or reduces water penetration around the top portion of the mast 202, at annular horizontal seal 206.

In one non-limiting example, the upper annular rotor mast seal 216, the annular horizontal seal, and the mast sleeve 218 can be made from any number of materials or composites, such as a polymer, a rubber, a plastic, a fiberglass, a metal, an alloy, or combinations thereof. Each of the upper annular rotor mast seal 216 the annular horizontal seal 206, and the mast sleeve 218 may be made from the same or different materials, or combinations of materials. Often, polymers may be selected from, e.g., polyurethane, cellulose, fluoropolymer, ethylene inter-polymer ahoy elastomer, ethylene vinyl acetate, nylon, polyether imide, polyester, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyamides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetheramides and polysiloxanes, and blends of polyetherimides and poly(etherimide-siloxane) copolymers, or combinations thereof.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A helicopter rotor mast seal assembly comprising:
    a vertical rotor mast having a longitudinal axis and an outer surface and is operably connected to a rotor system for creating flight;
    a mast sleeve aligned longitudinally with the axis and surrounding a portion of the vertical rotor mast, the mast sleeve having an outer surface, and an inner surface;
        an annular horizontal seal between the inner surface of the sleeve and the outer surface of the vertical rotor mast, wherein the annular horizontal seal comprises a base and one or more tines, each of the tines having a spring disposed between the tine and the base that provides a substantially fluid-tight connection to the mast sleeve, wherein the tines allow rotation of the vertical rotor mast and prevent water from entering a transmission connected to the vertical rotor mast; and
        an upper annular rotor mast seal affixed to the mast sleeve on the outer surface of the vertical rotor mast and extending outwardly sufficient to cover the annular horizontal seal.

2. The seal assembly of claim 1, wherein the upper annular rotor mast seal further comprises a vertical portion that covers the sleeve both horizontally and vertically.

3. The seal assembly of claim 1, wherein the upper annular rotor mast seal does not contact the sleeve.

4. The seal assembly of claim 1, wherein the upper annular rotor mast seal comprises a labyrinth seal.

5. The seal assembly of claim 1, wherein the upper annular rotor mast seal is a composite, a polymer, a rubber, a plastic, a fiberglass, a metal, an alloy, or combinations thereof.

6. The seal assembly of claim 1, wherein the annular horizontal seal is a composite, a polymer, a rubber, a plastic, a fiberglass, a metal, an alloy, or combinations thereof.

7. The seal assembly of claim 1, further comprising an annular mast cover affixed to the outer surface of the vertical rotor mast at the upper annular rotor mast seal, wherein the annular mast cover is a composite, a polymer, a rubber, a plastic, a fiberglass, a metal, an alloy, or combinations thereof.

8. The seal assembly of claim 7, wherein the polymer is at least one of a polyurethane, cellulose, fluoro-polymer, ethylene inter-polymer ahoy elastomer, ethylene vinyl acetate, nylon, polyether imide, polyester, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyamides, thermoplastic polyurethanes, polyphenylene sulfides, polyethylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of polyphenylsulfones with siloxanes, blends of polyphenylsulfones with polysiloxanes, poly(etherimide-siloxane) copolymers, blends of polyetheramides and polysiloxanes, and blends of polyetherimides and poly(etherimide-siloxane) copolymers, or combinations thereof.

9. A method of preventing water penetration into a rotorcraft rotor mast comprising:
    affixing an annular mast cover on an outer surface of a rotatable vertical rotor mast having a longitudinal axis, wherein the rotatable vertical rotor mast is operably connected to a rotor system for creating flight;
    positioning a sleeve aligned with the longitudinal axis that surrounds a portion of the vertical rotor mast, the sleeve having an outer surface and an inner surface;
    placing an annular horizontal seal between the inner surface of the sleeve and the annular mast seal, wherein the annular horizontal seal extends from the inner surface of the sleeve or extends from the annular mast seal to provide a first barrier that prevents water penetration, wherein the annular horizontal seal comprises a base and one or more tines, each of the tines having a spring disposed between the tine and the base that provides a substantially fluid-tight connection to the mast sleeve, wherein the tines allow rotation of the vertical rotor mast and prevent water from entering a transmission connected to the vertical rotor mast; and affixing an upper annular rotor mast seal to the mast sleeve, wherein the upper annular rotor mast seal extends outwardly from the annular mast cover sufficient to cover the annular horizontal seal, wherein the upper annular rotor mast seal prevents or reduces water penetration at the vertical rotor mast.

10. The method of claim 9, wherein the upper annular rotor mast seal further comprises a vertical portion that covers a top portion of the sleeve both horizontally and vertically.

11. The method of claim 9, wherein the upper annular rotor mast seal does not contact the sleeve.

12. The method of claim 9, wherein the upper annular rotor mast seal comprises a labyrinth seal.

13. The method of claim 9, wherein the upper annular rotor mast seal is a composite, a polymer, a rubber, a plastic, a fiberglass, a metal, an alloy, or combinations thereof.

14. The method of claim 9, wherein the annular horizontal seal is a composite, a polymer, a rubber, a plastic, a fiberglass, a metal, an alloy, or combinations thereof.

15. The method of claim 9, further comprising affixing an annular mast cover to the outer surface of the vertical rotor mast at the upper annular rotor mast seal, wherein the annular mast cover is a composite, a polymer, a rubber, a plastic, a fiberglass, a metal, an alloy, or combinations thereof.

16. The method of claim 15, wherein the polymer is at least one of a polyurethane, cellulose, fluoro-polymer, ethylene inter-polymer ahoy elastomer, ethylene vinyl acetate, nylon, polyether imide, polyester, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyamides, thermoplastic polyurethanes, polyphenylene sulfides, polyethylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of polyphenylsulfones with siloxanes, blends of polyphenylsulfones with polysiloxanes, poly(etherimide-siloxane) copolymers, blends of polyetheramides and polysiloxanes, and blends of polyetherimides and poly(etherimide-siloxane) copolymers, or combinations thereof.

17. A rotorcraft comprising:
a fuselage, one or more engines, and a main rotor gearbox; and
a vertical rotor mast connected to the main rotor gearbox, the vertical rotor mast having a longitudinal axis, an outer surface and is operably connected to a rotor system for creating flight;
a mast sleeve aligned with the longitudinal axis and surrounding a portion of the vertical rotor mast, the mast sleeve having an outer surface and an inner surface;
an annular horizontal seal between the inner surface of the mast sleeve and the outer surface of the vertical rotor mast, wherein the annular horizontal seal extends from the inner surface of the mast sleeve or extends from the outer surface of the vertical rotor mast, wherein the annular horizontal seal comprises a base and one or more tines, each of the tines having a spring disposed between the tine and the base that provides a substantially fluid-tight connection between the mast sleeve and the vertical rotor mast, wherein the tines allow rotation of the vertical rotor mast and prevent water from entering a transmission connected to the vertical rotor mast; and
an upper annular rotor mast seal affixed to the mast sleeve and extending outwardly from the outer surface of the vertical rotor mast sufficient to cover the annular horizontal seal and the sleeve.

18. The rotorcraft of claim 17, wherein the upper annular rotor mast seal further comprises a vertical portion that covers the sleeve both horizontally and vertically.

19. The rotorcraft of claim 17, wherein the upper annular rotor mast seal does not contact the sleeve.

20. The rotorcraft of claim 17, wherein the upper annular rotor mast seal comprises a labyrinth seal.

21. The rotorcraft of claim 17, wherein the upper annular rotor mast seal is a composite, a polymer, a rubber, a plastic, a fiberglass, a metal, an alloy, or combinations thereof.

22. The rotorcraft of claim 17, wherein the annular horizontal seal is a composite, a polymer, a rubber, a plastic, a fiberglass, a metal, an alloy, or combinations thereof.

23. The rotorcraft of claim 17, further comprising an annular mast cover affixed to the outer surface of the vertical rotor mast at the upper annular rotor mast seal, wherein the annular mast cover is a composite, a polymer, a rubber, a plastic, a fiberglass, a metal, an alloy, or combinations thereof.

24. The rotorcraft of claim 17, wherein at least one of the annular horizontal seal, or the upper annular rotor mast seal at least partially comprises a polymer selected from at least one of a polyurethane, cellulose, fluoro-polymer, ethylene inter-polymer ahoy elastomer, ethylene vinyl acetate, nylon, polyether imide, polyester, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyamides, thermoplastic polyurethanes, polyphenylene sulfides, polyethylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of polyphenylsulfones with siloxanes, blends of polyphenylsulfones with polysiloxanes, poly(etherimide-siloxane) copolymers, blends of polyetheramides and polysiloxanes, and blends of polyetherimides and poly(etherimide-siloxane) copolymers, or combinations thereof.

* * * * *